No. 661,739. Patented Nov. 13, 1900.
T. HANSON.
INSECT EXTERMINATING MACHINE.
(Application filed June 23, 1898.)
(No Model.) 13 Sheets—Sheet 1.

No. 661,739. Patented Nov. 13, 1900.
T. HANSON.
INSECT EXTERMINATING MACHINE.
(Application filed June 23, 1898.)

(No Model.) 13 Sheets—Sheet 2.

FIG. 2.

Witnesses.
W. E. Allen
E. H. Allen

Inventor.
Tom Hanson.
By Knight Bros
Attys.

No. 661,739. Patented Nov. 13, 1900.
T. HANSON.
INSECT EXTERMINATING MACHINE.
(Application filed June 23, 1898.)
(No Model.) 13 Sheets—Sheet 3.

No. 661,739. Patented Nov. 13, 1900.
T. HANSON.
INSECT EXTERMINATING MACHINE.
(Application filed June 23, 1898.)

(No Model.) 13 Sheets—Sheet 4.

No. 661,739. Patented Nov. 13, 1900.
T. HANSON.
INSECT EXTERMINATING MACHINE.
(Application filed June 23, 1898.)

(No Model.) 13 Sheets—Sheet 5.

Witnesses.
W. E. Allen.
E. K. Allen.

Inventor.
Tom Hanson.
By Knight Bros.
Atty.

No. 661,739.　　　　　　　　　　　　　　　　Patented Nov. 13, 1900.
T. HANSON.
INSECT EXTERMINATING MACHINE.
(Application filed June 23, 1898.)

(No Model.)　　　　　　　　　　　　　　　　13 Sheets—Sheet 7.

No. 661,739. Patented Nov. 13, 1900.
T. HANSON.
INSECT EXTERMINATING MACHINE.
(Application filed June 23, 1898.)
(No Model.) 13 Sheets—Sheet 8.

Witnesses.
W. E. Allen.
E. K. Allen.

Inventor.
Tom Hanson.
By Knight Bros
Attys.

No. 661,739.  
T. HANSON.  
INSECT EXTERMINATING MACHINE.  
(Application filed June 23, 1898.)  
(No Model.)

Patented Nov. 13, 1900.

No. 661,739. Patented Nov. 13, 1900.
T. HANSON.
INSECT EXTERMINATING MACHINE.
(Application filed June 23, 1898.)
(No Model.) 13 Sheets—Sheet 10.

Witnesses.
W. E. Allen.
E. K. Allen.

Inventor.
Tom Hanson.
By Knight Bros.
Attys.

No. 661,739. Patented Nov. 13, 1900.
T. HANSON.
INSECT EXTERMINATING MACHINE.
(Application filed June 23, 1898.)

(No Model.) 13 Sheets—Sheet 11.

Witnesses.
W. E. Allen.
E. K. Allen,

Inventor.
Tom Hanson.
By Knight Bros
Attys.

No. 661,739. Patented Nov. 13, 1900.
T. HANSON.
INSECT EXTERMINATING MACHINE.
(Application filed June 23, 1898.)
(No Model.) 13 Sheets—Sheet 12.

Witnesses.
W. E. Allen
E. K. Allen

Inventor.
Tom Hanson.
By Knight Bros
Attys.

No. 661,739. Patented Nov. 13, 1900.
T. HANSON.
INSECT EXTERMINATING MACHINE.
(Application filed June 23, 1898.)
(No Model.) 13 Sheets—Sheet 13.

Witnesses.
W. E. Allen
E. K. Allen

Inventor.
Tom Hanson.
By Knight Bros
Attys.

UNITED STATES PATENT OFFICE.

TOM HANSON, OF COVINGTON, INDIANA.

INSECT-EXTERMINATING MACHINE.

SPECIFICATION forming part of Letters Patent No. 661,739, dated November 13, 1900.

Application filed June 23, 1898. Serial No. 684,269. (No model.)

*To all whom it may concern:*

Be it known that I, TOM HANSON, a citizen of the United States, and a resident of Covington, in the county of Fountain and State of Indiana, have invented certain new and useful Improvements in Insect-Exterminating Machines, of which the following is a full, clear, and exact description, reference being had to the accompanying drawings.

My invention relates to a machine which combines mechanism for cultivating the ground between rows of plants with mechanism for dislodging or brushing insects from the plants into a receptacle by which they are held captive or destroyed.

The implement consists of a suitable longitudinal or main frame, upon which is mounted the insect-receptacle or crushing mechanism, together with the coöperating parts and driving mechanism therefor, and to which are attached the controlling-handles and the draft appliances, as well as a front traction-wheel and a rear support, which latter may be either in the form of pulverizing disks or rollers; also, a base-frame detachably secured to the longitudinal or main frame and provided with soil-stirring parts, which are adapted to throw the soil up to the plant-rows when desired; also, means whereby the base-frame may be adjusted in width at will through the medium of the handles, and also various novel features of construction of the several parts whereby the objects of the invention are readily carried out, as will be hereinafter fully described, and particularly pointed out in the claims.

In the accompanying drawings, forming part of this specification, Fig. 3 is a rear view of the same. Fig. 4ᵃ is a view of the cross-shaped piece which makes sliding connection with the meeting ends of the cross-braces. Fig. 13 represents a controlling-rod. Fig. 23 is a top view showing the manner of connecting scraper-bars to the short cross-braces of the base-frame.

Figures 4, 5, 14:
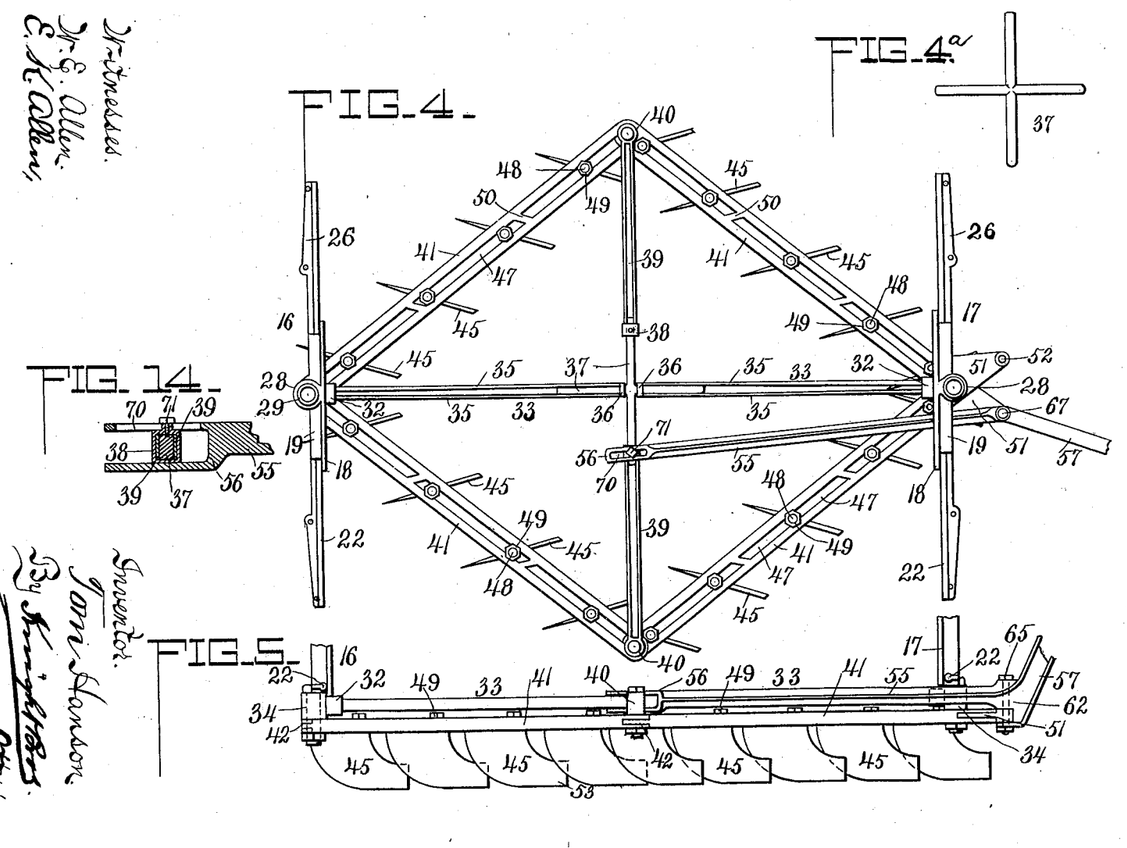
Fig. 4 is a plan view of the frame or bars with the standards, lower cross-bars, and cultivator-plows.
Fig. 5 is a side view of the parts shown in Fig. 4.
Fig. 14 illustrates the manner of connecting the handles to the cross-braces of the base-frame.
Figures 21, 22, 24, 25:
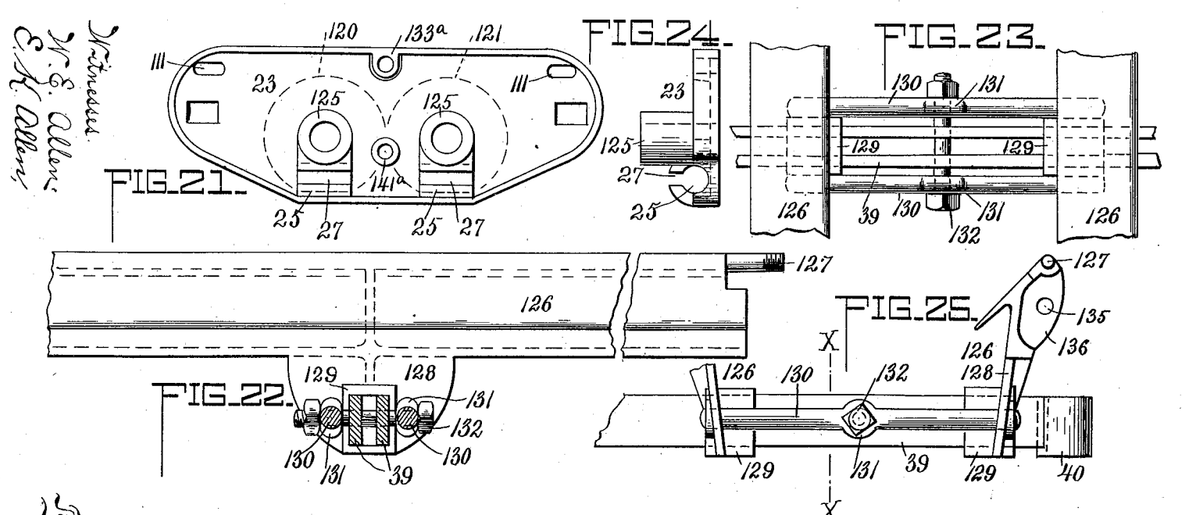
Fig. 21 is a detail of one of the end bearing-plates for the crushing-rollers.
Fig. 22 is a detail view of a scraper-bar and a section taken on line $x\ x$, Fig. 25.
Fig. 24 is an end view of the bearing-plate shown in Fig. 21.
Fig. 25 is a detail end view of one of the scraper-bars and middle connections.
Figures 32, 33:
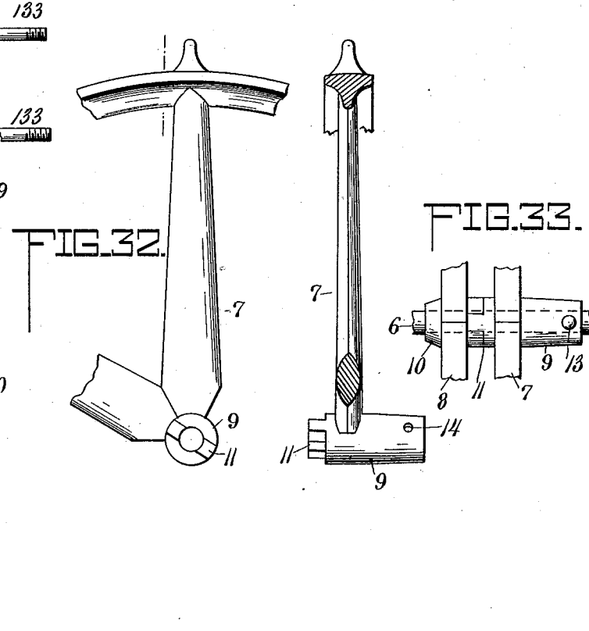
Fig. 32 represents by detail views the forward traction-wheel.
Fig. 33 is a detail showing connection between main driving-sprocket and forward traction-wheel.
Figures 34, 35, 36:
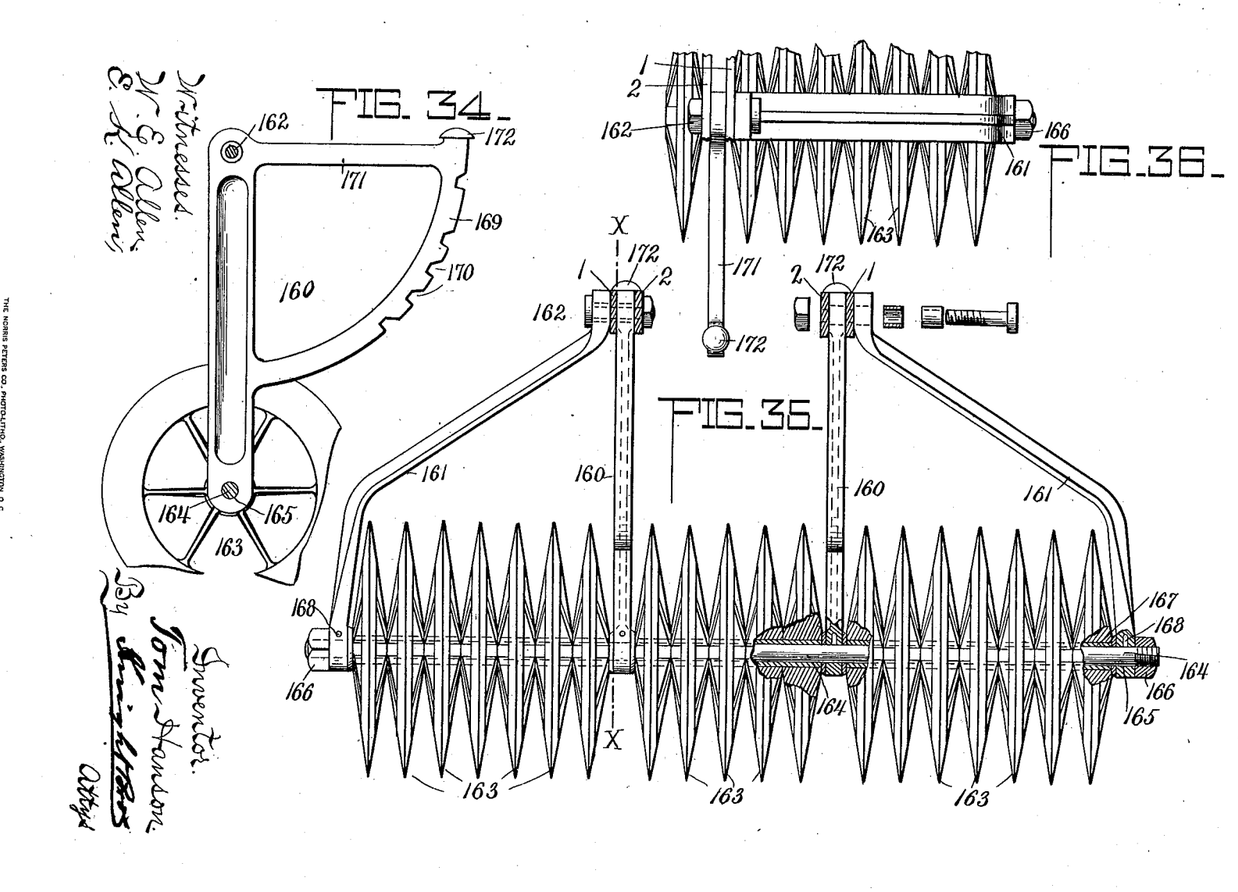
Fig. 34 is a section on line $x\ x$, Fig. 35.
Fig. 35 is a rear view of cultivator-wheels and mountings.
Fig. 36 is a top view of the right-hand end of the cultivator-wheels and mountings.
Figures 37, 38, 39, 40, 41, 42:
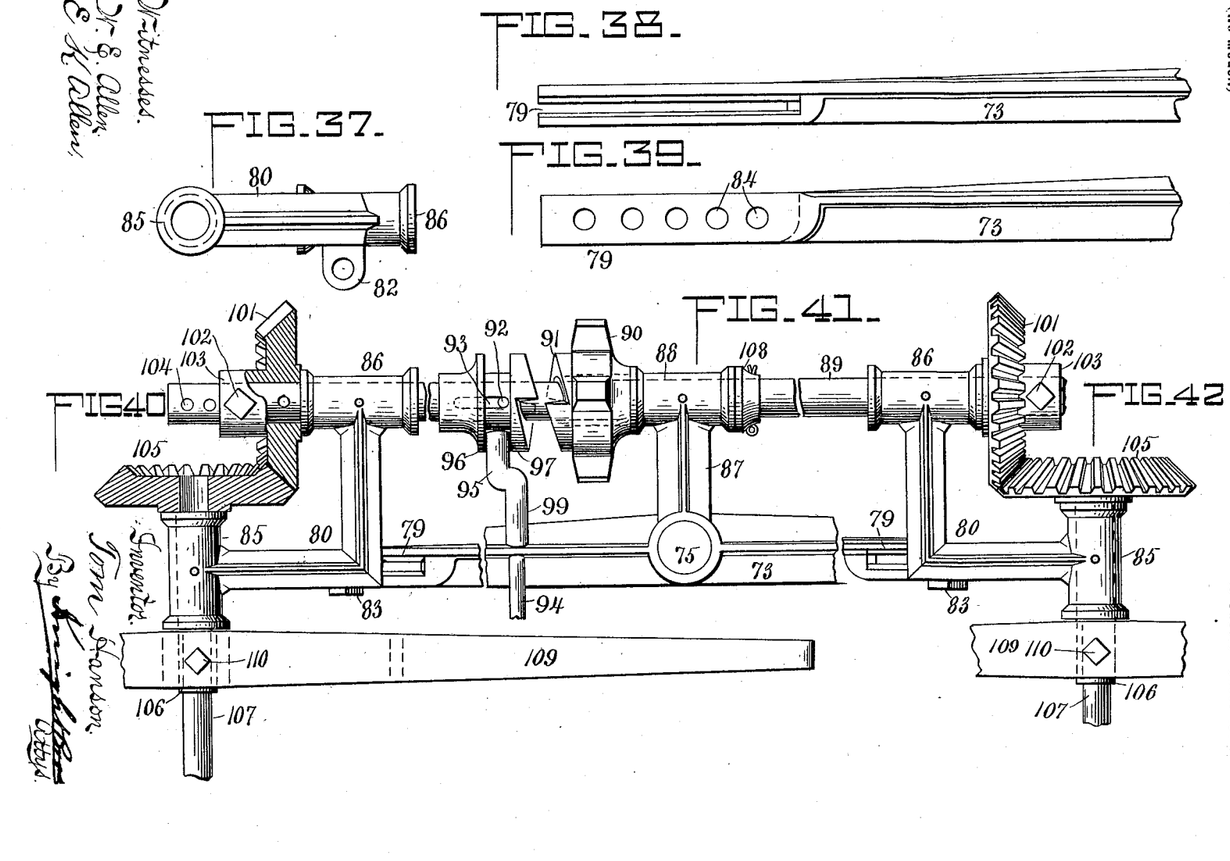
Fig. 37 is a detail view of the right-angle bracket used on the upper forward cross-bar.
Figs. 38 and 39 are respectively a top and a rear view of end of the upper forward cross-bar.
Fig. 40 is a view of said upper forward cross-bar and mechanism mounted thereon.
Fig. 41 is a detail view of middle portion of same with mechanism carried thereby.
Fig. 42 is a detail view of right-hand end of same with adjacent mechanism.

1 2 represent a pair of U-shaped bars provided with slots 3 on either side near their forward ends, through which pass securing-bolts 4 of adjustable bearings 5 for the ends of an axle 6. On this axle 6 are mounted traction-wheel 7 and sprocket 8, having their hubs 9 and 10 mortised together at 11, Figs. 1, 2, 31, and 33, so that the traction-wheel will turn the sprocket. The latter through chain 12 drives the machinery. A pin 13, passing through a hole 14 in hub 9, Fig. 33, secures the axle against side motion. Rigidly fastened to the U-bars 1 2 by bolts 15 are the front and rear standards 16 and 17, similar in construction and each consisting of an attaching-plate 18, having strengthening-ribs 19, slots 20, through which the U-shaped bars 1 2 pass, and orifices 21, and an integral cylindrical cross-bar 22, which extends the width of the machine and affords support for end plates 23 24, the bar passing through sockets 25, Figs. 21 and 24, in said plates. The plates 23 24 are held against turning by rib 26, formed on the bar and passing through slots 27 of the socket in said plates. At the upper end of each plate 18 is a vertical socket 28, in which is mounted a threaded tube 29, the reduced end of which is secured by means of collar 30 and screw 31. At the middle of the bottom of each plate 18 is a socket 32, which receives the end of one of the long brace-bars 33, each of which consists of a socket 34 and two parallel strips 35, having their free ends inclosed by a collar 36, Fig. 4. They are alined by a cross-shaped piece 37, two arms of which pass through said collars, while its other two arms pass through collars 38 on cross-braces 39, formed similarly to the longitudinal braces, with sockets 40 at their outer ends. Diagonally between the socket-heads 34 and 40 extend cultivator-plow bars 41, the ends 42 of which are mortised to each other and bolted to the socket-heads 34 and 40. A bearing-sleeve 43, interposed between the securing-bolts and secured parts, allows pivotal motion.

On the under side of each bar 41 is a series of diagonal recesses 44 for alining cultivator-plows 45, the squared necks 46 of the plows passing up through slots 47 in the bars and their threaded ends 48 being secured by nuts 49. The bars 41 are strengthened by ribs 50, the two rear bars having in addition to the above features a triangular projection 51, provided with a hole 52 for a purpose to be described.

Figures 26, 27, 28:
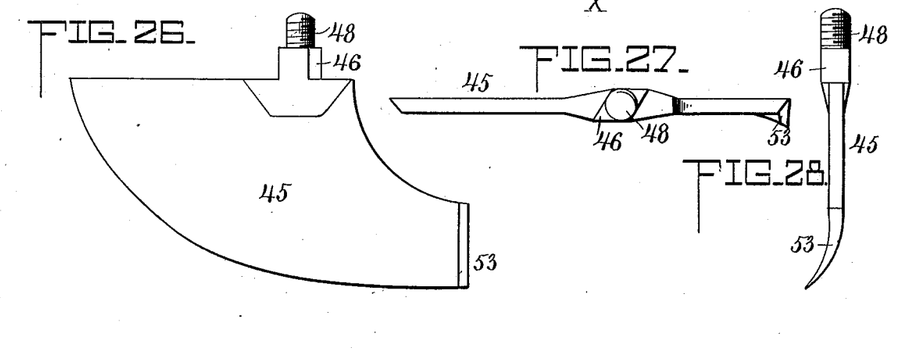
Figs. 26, 27, and 28 are side, top, and end views of a cultivator-plow.
Figure 29:
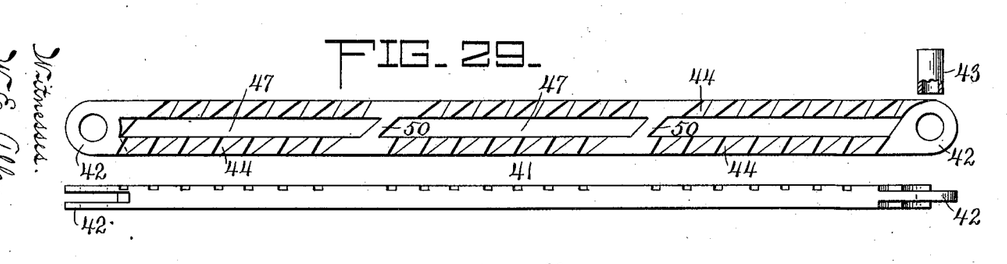
Fig. 29 represents by bottom and side views one of the diagonal bars of the base-frame for supporting the cultivator-plows.

The cultivator-plows may be of any suitable number. In addition to having considerable shear from front to rear the heel 53 of each plow is curved slightly out of the vertical plane, as shown in Figs. 26, 27, and 28, so as to stir the soil after the plow has furrowed it.

54 represents the handles, Figs. 1, 2, 4, and 17, each consisting of a horizontal portion 55, having a heel 56 and an obliquely-inclined portion 57, having at its upper extremity the grips 58. At points 59 just below the grips are pivotally secured internally-threaded socket-pieces 60, Fig. 16, which receive the threaded ends of a crank-shaped adjusting-rod 61, Fig. 19. For purposes of strength and lightness the part 57 is made of double inverted-T iron and the part 55 is made X-shaped in cross-section. In each handle at the point where the horizontal meets the oblique portion there is formed an enlargement 62, into the lower part of which is cut a recess 63, which latter receives the corresponding projection 51 on the rear diagonal bars 41. The handle and projection are pivotally secured by a bolt 65 with a reduced threaded end 66, said bolt passing through vertical bore 67 in the enlargement and the circular hole 52 in the projection. At the forward end of the horizontal portion of each handle is a bifurcated end 56, the upper part of which has a slot 70. The bifurcated ends 56 embrace the boxing 38, which incloses the ends of each brace 39, and are secured with respect to the latter by a set-screw 71 passing through slot 70 and binding on the cross 37, Fig. 14. As the other two arms of the cross 37 lie loosely inclosed in the braces 33, it will be seen that by turning the crank in the grip end of the handles, with bolts 65 as pivots, the frame or base 41 may be collapsed or expanded at will, and by simply loosening screws 71, to adjust braces 39 in or out with respect to the cross 20, I thus provide for the rapid and convenient adjustment of the frame at will to suit different row-spaces.

73 is the front upper cross-bar, and 74 the rear upper cross-bar. Each is mounted on its standard by means of a threaded socket 75, which fits on screw-threaded tube 29, and is adjusted vertically on said tube by rotating the tube through the medium of handle 76, the neck 77 of which is tightly secured by pin 78. The handle 76 also affords rein-loops or terrets to hold the reins out of contact with the machinery. Slotted ends 79 of the bars 73 74 receive the necks 82 of brackets 80 80 and 81 81, the slots being wider on the upper side than on the lower side, that the necks may wedge tightly therein, said necks being further secured by a nutted bolt 83 passed through each neck and one of a series of holes 84 in the arm. The brackets 80 are right-angular with a shaft-bearing 85 86 at the respective ends of said brackets. The brackets 81 have but a single bearing mounted directly at the top of the neck. For lightness the cross-bars and brackets are made X-shaped in cross-section. The front upper cross-arm alone has at its middle a projection 87, with a bearing 88 at the end thereof.

Through the bearings 86 and 88 passes the drive-shaft 89, near the middle of which is mounted a small sprocket 90, which is connected to sprocket 8 by chain 12 and through which the shaft is rotated. Integral with sprocket 90 is one face of a clutch 91, the other face of the clutch being slidably secured to shaft 89 by pin 92 passing through slot 93, which is long enough to allow of engagement and disengagement by means of the rotation of controlling-rod 94, the eccentric end 95 of which works between flanges 96 and 97. This controlling-rod 94 extends to the rear cross-bar, where loop-handle 64 is pivotally secured thereto at 67, a washer 98 serving, in conjunction with enlarged head 99, to retain the bar in longitudinal adjustment, and a pin 100 on the rear cross-arm retaining the handle in position, Fig. 3.

A beveled gear 101 is mounted at each end of shaft 89 by threaded bolt 102 passing through hub 103 and one of a series of holes 104 and meshes with bevel-gear 105, the elongated hub 106 of which is mounted in bearing 85 and the extremity of which receives and is bolted to the end of a paddle-shaft 107. Shaft 89 is kept from side play by collar 108 in connection with hub of sprocket 90. The mechanisms on opposite sides of the machine are identical in construction, except as to the driving-sprocket and the controlling-rod. A description of one side is therefore deemed sufficient.

Paddle-arm 109 is fastened by a bolt 110, which also secures elongated hub 106 to paddle-shaft 107, and similar arm 112 is held in place by a bolt 113, which also fastens the opposite end of the paddle-shaft 107 to the reduced portion 114 of the elongated hub of sprocket 115, which hub finds support in bearing 81. The paddle-arms 109 and 112 are slotted to receive the edges of blades 116, by which the brushing and beating of the plants are accomplished. The outer portion of each paddle-arm is curved, so that in striking the vines the blade first touches at a point about one-third from the end, thus bending the plants instead of breaking them.

The sprocket 115 referred to communicates motion by means of chain 117 to sprocket 118 on the shaft 119 of the inner crushing-roller 120. Motion is imparted to the outer crushing-roller 121 by gear 122 on said shaft 119 meshing with similar gear 123 on shaft 124 of crushing-roller 121. Each pair of hollow crushing-rollers is mounted between a front and back plate 23 24, the ends of the shaft of the crushing-rollers resting in boxings 125. The threaded forward ends of the shafts are secured by nuts, while on the rear ends, which are threaded both right and left, are placed the intermeshing gears 122 and 123, the former secured by sprocket 118 and a nut and the latter by a nut alone.

126, Figs. 21 to 25, represents scrapers mounted at the sides of each pair of rollers by means of threaded ends 127, passed through slots 111 in the end plates 23 and there secured by nuts, the middle of each scraper-bar having a depending part 128, with a box or collar 129, which fits around the short brace 39, the scrapers being secured at the proper distance apart by short adjustable rods 130, the threaded ends of which pass through slight enlargements in lugs 128.

Through an orifice in an enlargement 131 in the middle of each rod 130 and through the brace 39 passes a bolt 132, locking all parts in position. Wear is taken up on the scrapers by adjusting the rods 130, the ends 127 of the scraper being adjustable in elongated slots 111. The scrapers clean the rollers, and also, in connection with a light rod 133, Fig. 2, that passes through bosses 133$^a$, Fig. 21, screen the vines from crushing. Rods 134, Fig. 1, serve as braces for the end plates, passing through orifices 135 in the scraper-rib 136, Fig. 25.

Figure 30:
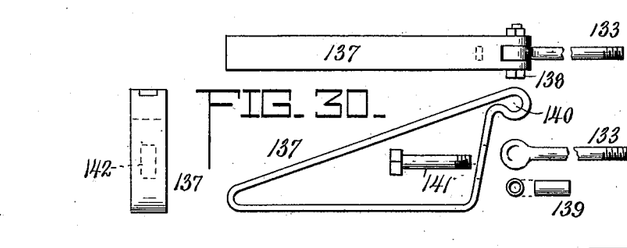
Fig. 30 represents by end, top, and side views the vine-guard and its means of attachment.
Figure 31:
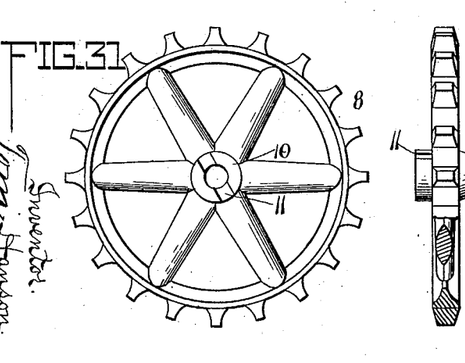
Fig. 31 represents by side and edge views the main driving sprocket-wheel.

Vine-guards 137 extend in front of the crushing mechanism to lift the vines that may be prone or drooping. By referring to Fig. 30 it will be seen that they are triangular in elevation and hinged to one end of rod 133, by a bolt 138, passing through a sleeve 139, lying in loops 140, formed in the guard, and an eye in the end of the rod. A threaded bolt 141, passing through an elongated slot 142 into boss 141$^a$, regulates the height to which the guard may rise and also holds it in vertical alinement.

Figures 1, 15:
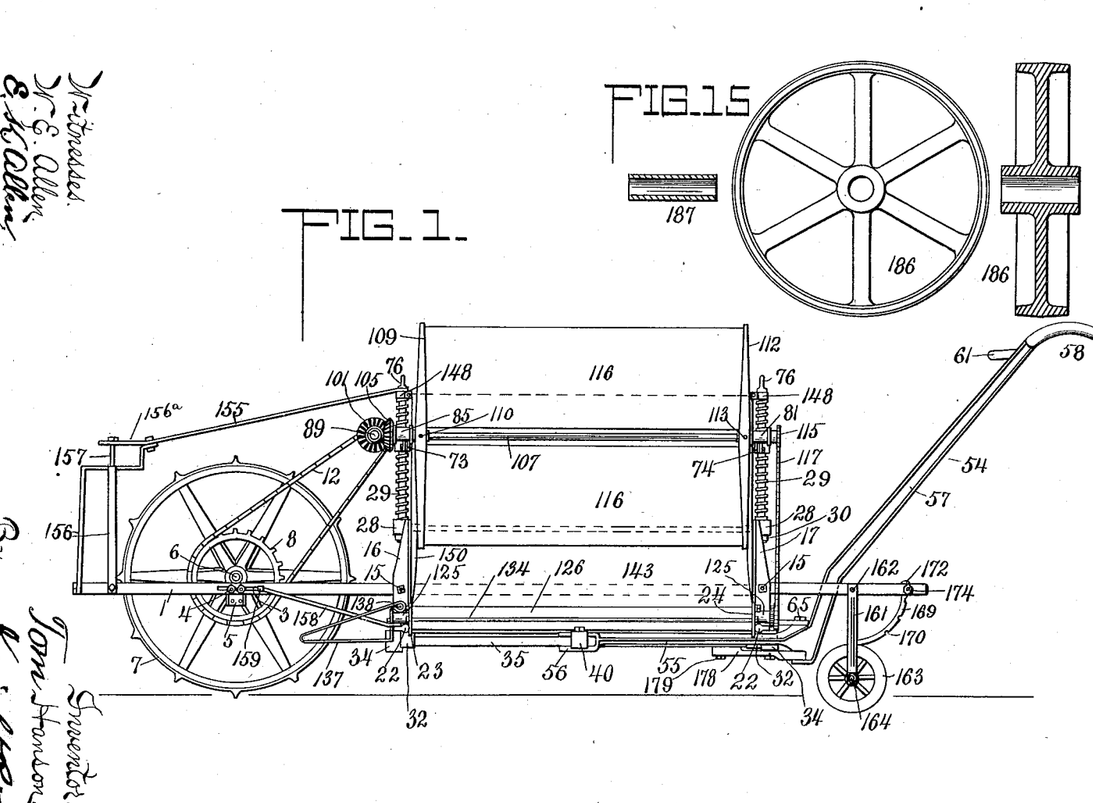
Figure 1 is a side elevation of my improved machine, the cultivator-plows and rear traction-wheels being detached and the cultivator-wheels being attached.
Fig. 15 shows one of the rear traction-wheels.
Figure 2:
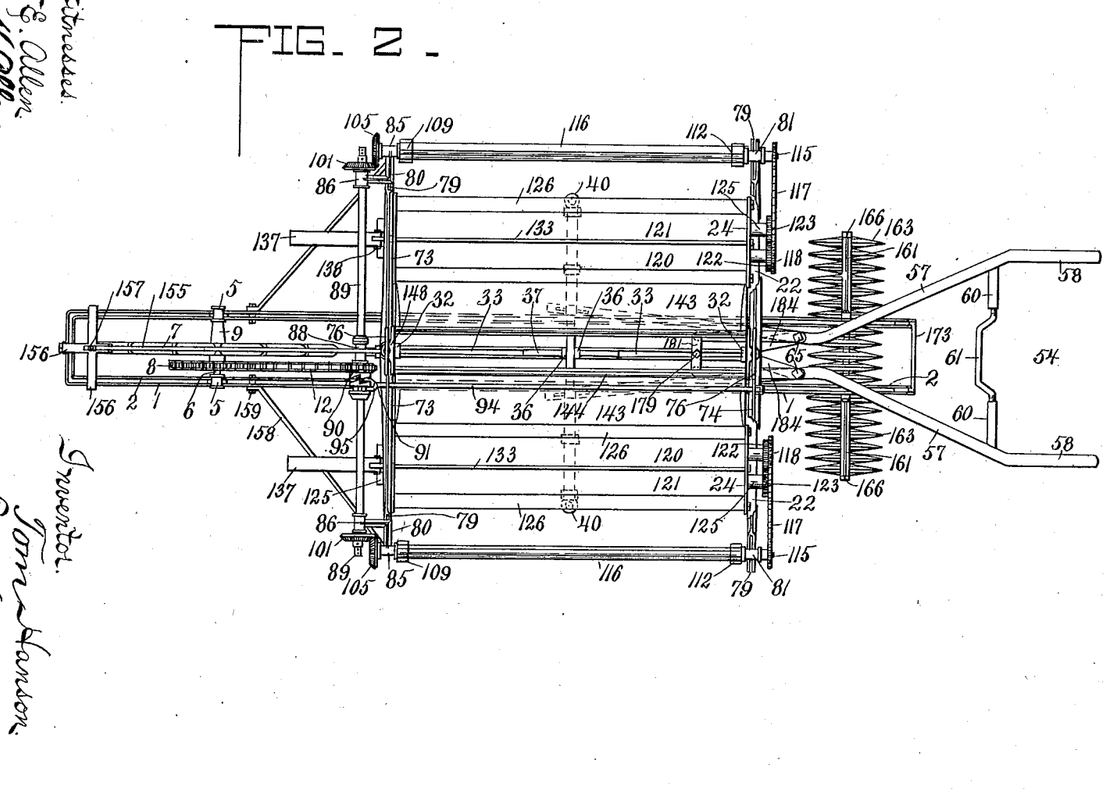
Fig. 2 is a plan view of the same.
Figures 9, 10, 11, 12:
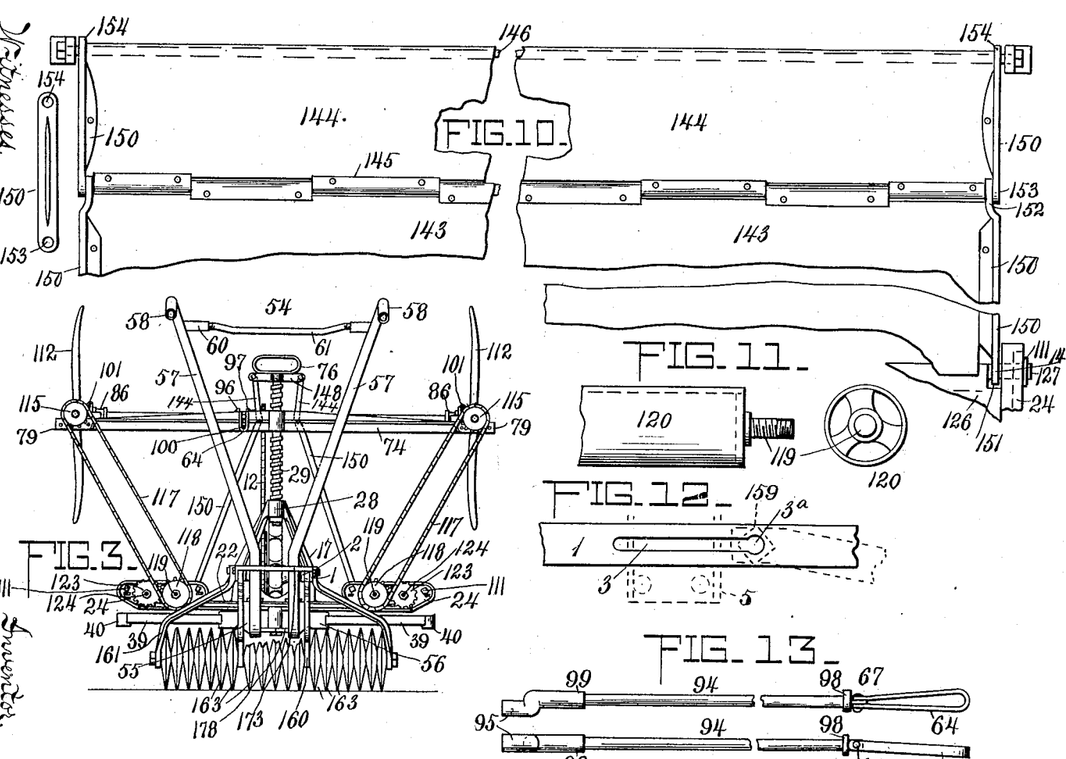
Fig. 10 is a detail view of the upper portion of the partitions.
Fig. 11 shows details of the end of a crushing-roller.
Fig. 12 is a section of the U-bar.
Figures 16, 17, 18, 19, 20:
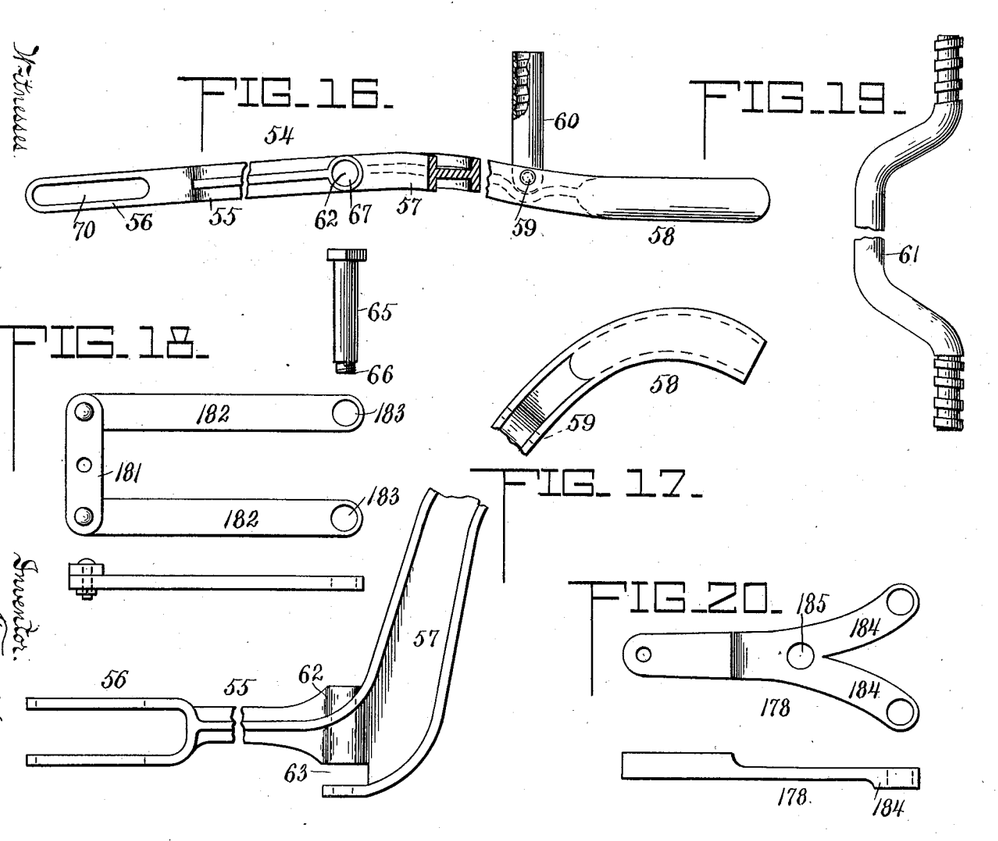
Figs. 16 and 17 are a plan and a side view of a guiding-handle.
Fig. 18 represents one pair of the handle brace-bars for use with the auxiliary frame.
Fig. 19 represents the adjustable connecting-bar for the handles.
Fig. 20 represents the construction of the Y-bar used with substitute frame.
Figures 43, 44, 45, 46, 47, 48:
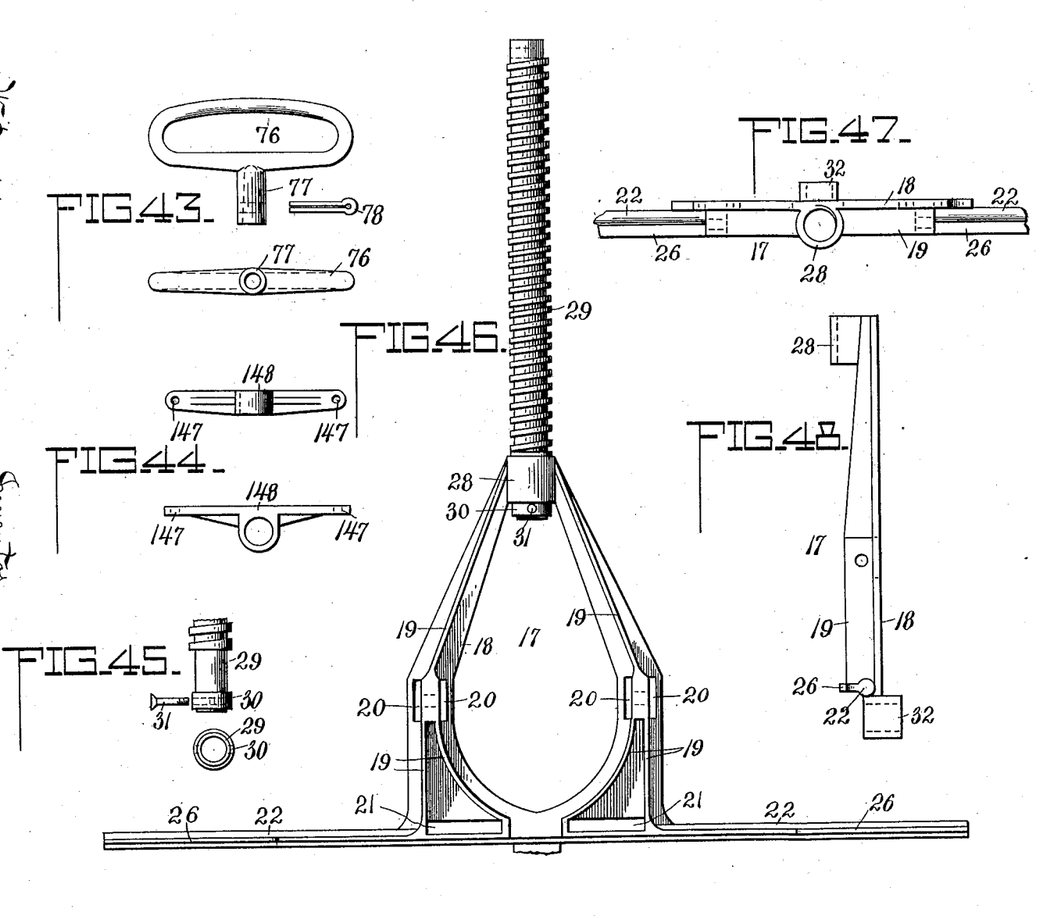
Fig. 43 represents by side and bottom views the adjusting-handle and rein-guide.
Fig. 44 shows two views of the bracket to receive rods which support the top edge of partitions.
Fig. 45 is a detail view of lower end of the tubular screw-threaded standard.
Fig. 46 is a rear view of the rear standard and lower cross-bar.
Figs. 47 and 48 are respectively a top view of the middle portion and a side elevation of the same.

The partitions, Figs. 1 and 10, are each formed of a long and a short piece 143 and 144, hinged together over a light rod at 145. Through the upper edge of each partition extends a rod 146, the ends of which are secured by nuts in the ends 147 of short arms 148, Fig. 44, interposed loosely between handles 76 and the top of the threaded tubes 29. The lower edge of each partition is secured to the inner scraper-bar on that side by slipping the end 127 of the bar through an eye in the lower end 149 of the side pieces 150 of the partitions, the bar being cut away at 151 to allow of this, Fig. 10. The edges of the partitions are secured in the side strips 150, which are provided with eyes 152, 153, and 154, for the passage of the hinge-rods and the upper supporting-rod. An advantage in constructing the partitions of sections 143 and 144 is that they may thus be adjusted, as suggested in Fig. 3, along with the parts 24, the hinging-joint between the sections 143 and 144 permitting the partition to adapt itself to any adjustment of the parts 24 and the crushing means which they carry. The corresponding sections 143 and 144 of the respective partitions will approach one another when the crushing means are removed to the inner limits of their adjustment, and this leaves a recess, as it were, slightly out of the path of the backwardly-inclined fan-blades, so that the latter may deliver the insects below the joint between said sections 143 and 144, while the upper portions of the sections 144, projecting outward toward the paddles, prevent the suction of the revolving paddles from blowing or discharging the insects over the machine, as would be the case if the partitions were vertical.

Between the front short arm 148 and the handle 76 is interposed the end of a rod 155, which braces the draft mechanism, which latter consists, essentially, of three uprights 156 and a tongue 156$^a$, in which is mounted a coupling-pin 157, for the reception of the whiffletree, &c.

158 represents short braces between the ends of front lower cross-arm 22 and the U-bars, to which they are bolted just abaft the axle of the forward traction-wheel, the bolt 159 passing through an enlargement 3$^a$ in the slot 3. At the rear ends of the U-bars is the rear supporting mechanism, which consists of frames 160 161, Figs. 1, 3, 34, and 35, pivotally bolted at 162 to the U-bars and cultivator-disks 163, strung on a shaft 164, which passes through holes 165 in the lower ends of the frames and is fastened at its ends by nuts 166. Sleeves 167 are interposed between the axle and disks to diminish friction.

Figures 49, 50, 51, 52, 53, 54, 55, 56:
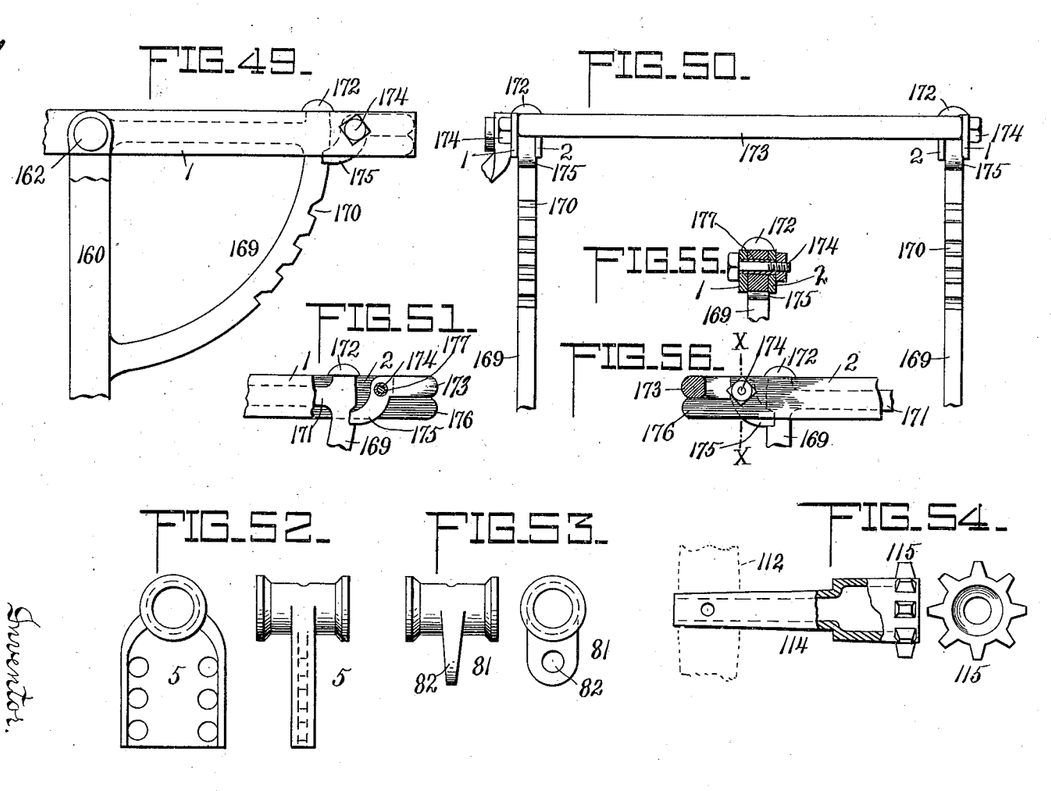
Fig. 49 is a detail view of rear end of U-bars and adjustable supporting mechanism for the rear of the machine.
Fig. 50 is a rear view of the same.
Fig. 51 is a detail section of a part shown in Fig. 49.
Fig. 52, an adjustable bracket-support for the main axle.
Fig. 53 shows by side and end views a bracket used on rear upper cross-bar.
Fig. 54 shows a side and an end view of a sprocket used on the upper rear cross-bar.
Fig. 55 is a section on line x x, Fig. 56.
Fig. 56, a detail end view of parts shown in Figs. 49 and 50.

168 represents oil-holes in the axle-bearings.
The frames 160 have triangular rack portions 169, working in the vertical slots of the U-frame and containing notches 170 and braced by an arm 171, a knob 172 limiting the downward movement of the rack portions. The rear ends of the U-bars are joined by the cross-rod 173, pivotally bolted between each pair of ends at 174. Dogs 175, Fig. 56, formed on the bent ends of this arm, engage notches 170 of racks 169 and hold them to any adjustment. Projections 176 on the ends of the U-bar limit the downward movement of the cross-rod 173. Sleeves 177, Fig. 55, between bolts 174 and adjacent parts, allow of easy pivotal movement. When rod 173 is raised, the dogs 175 are withdrawn from notches 170, and frames 160 161 are forced up by the weight of the machine resting on pivot 162 until the next notch is reached. Easy vertical adjustment of the machine is thus provided for at the rear end.

When it is desired to use the machine without the cultivator-plows, the bolts securing the ends of the diagonal bars of the base-frame are withdrawn, the handles unfastened at point 52, and the bars removed. To procure a bearing for pivot-point 52, Y-shaped plate 178 is secured on the long brace 33, near the rear lower cross-bar, by a bolt 179, passing through it, up through a wooden block 180, located between strips 35, and through a short strip 181 above the strips 35 and there secured with a nut. To the ends of the strip 181 is secured one end of each of the strips 182, which extend rearwardly through slots 21 in rear upright 17 till the holes 183 register with those in enlargements 62 of the handles 54, forked ends 184 extending beneath the lower cross-bars and entering recesses 63 in the handle. By returning bolt 65 to its proper place the handles again find a pivot-point, which is made secure by passing the bolt formerly used to hold the two rear diagonal bars together through the head of rear brace 33 and hole 185 in the Y-bar.

In lieu of the disks 163 traction-wheels 186 may be employed. In this case the middle long sleeve 167 is removed from the axle 164 and shorter sleeves 187 used.

When desired to dispense also with the crushing apparatus and catch the insects alive in a pan, the apparatus is removed by unfastening chains 117, unfastening the handles at 52 and 71, removing bolts at front and rear of diagonal frame, withdrawing bars 35, when the crushing mechanism may be slid off the lower cross-bars. Longitudinal brace-bar 188 is then passed through sockets 32 in the uprights, a cross-strip 189 bolted to its middle part, side strips 190 secured to the ends of the cross-arms and cross-strip, handle ends 56 secured at holes 191 and bars 178 181 182, as in former case, when pan 192 may be rested on the frame thus formed. Said pan has its sides inturned at the top, as at 193, a wire 194 bracing same. This prevents insects from crawling out. The pan is emptied by tipping it and withdrawing slide 195. The operation will be easily understood.

Motion imparted by traction-wheel 7 through sprocket 8 and chain 12 to sprocket 90 is transmitted through shaft 89 to gearing 101 105, operating paddle-shafts 107, and through said shafts 107, sprockets 115, and chains 117 to sprocket 118, shaft 119 transmitting to gears 122 123, operating the crushing-rollers.

When it is desired to make the machine fit narrow row-spaces, brackets 80 81, gears 101, and end plates 23 24 are adjusted toward the longitudinal axis of the machine, adjusting-crank 61 is turned, the diamond frame contracting, as before explained, and bolts tightened. The partitions adjust themselves, being connected to the crushing mechanism.

The fans are adjustable up and down to suit heights of different vines or bushes by turning the screw-tubes 29 by means of handles 76.

Figures 6, 7, 8, 9:
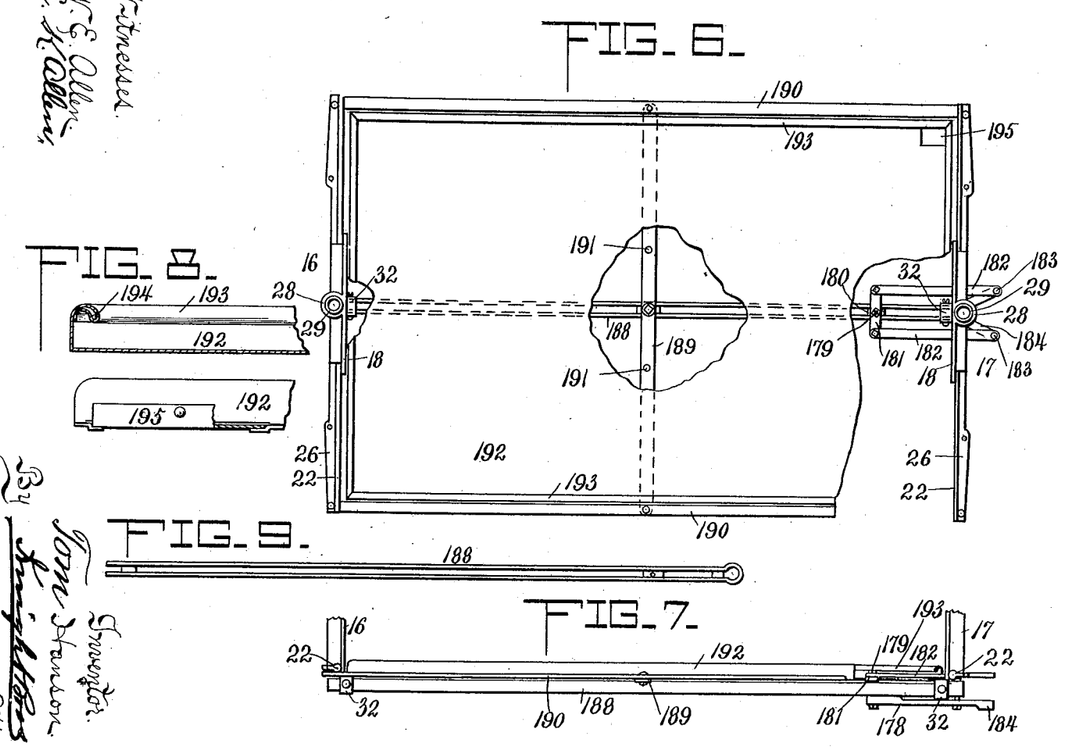
Figs. 6 and 7 are respectively a plan and side view of the substitute frame, standards, lower cross-bars, and pan.
Fig. 8 shows details of the pan.
Fig. 9 is a detail view of the long brace-rod used in the substitute frame.
Figures 57, 58, 59, 60:
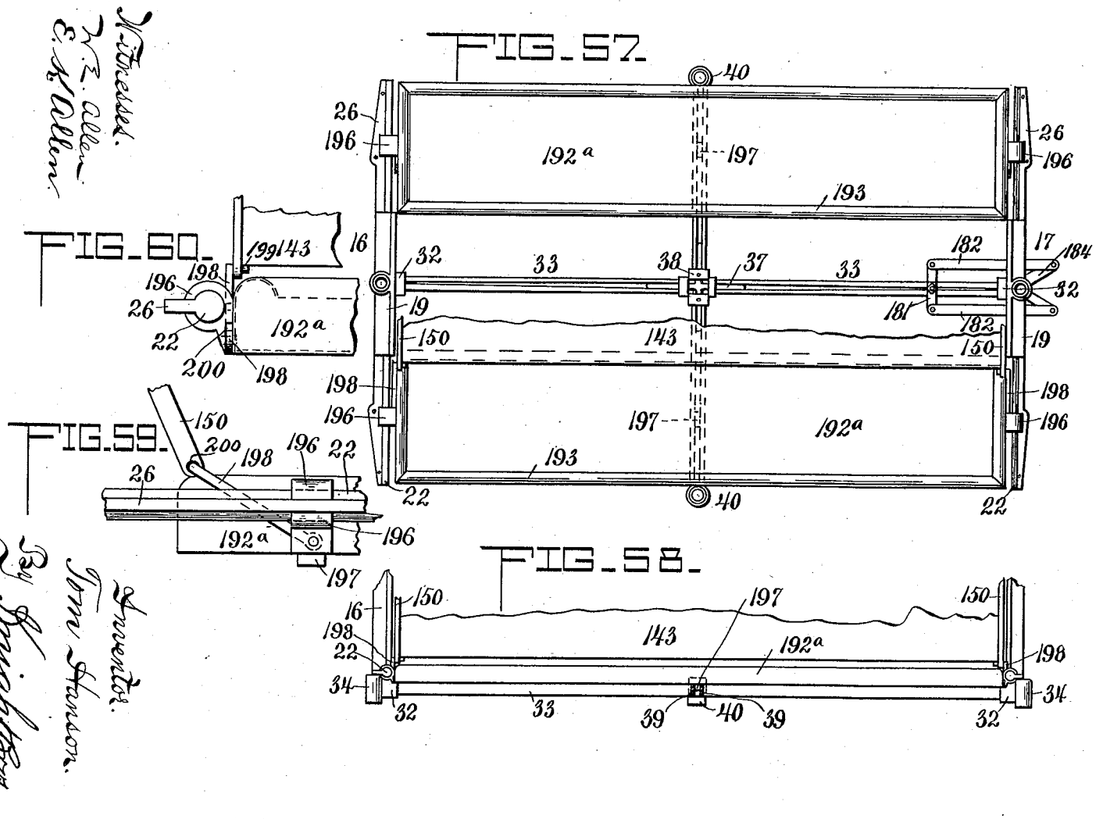
Figs. 57 and 58 are respectively a plan and a side elevation of a pair of receiving-pans which may, if desired, be employed instead of a single pan, as shown in Fig. 6.
Figs. 59 and 60 are enlarged detail views showing the attachment of the lower end of the partition to one of the pans.

If desired, a separate receptacle or pan 192ª may be employed at each side of the machine, as shown in Figs. 57 and 58, instead of a single pan 192, as shown in Fig. 6, and these pans are preferably attached to the cross-arms 22 of the uprights 16 and 17 by means of the clips 196, fitting upon said cross-arms, said pans also having on their under sides central projections 197, which enter the slots of the cross-braces 39 for the purpose of steadying the pans. When using the individual pans at the respective sides of the machine, I prefer to employ for the attachment of the lower ends of the partition 143 144 braces 198, having studs 199, which enter openings 200 in the lower edges of the partitions 143.

Having thus described my invention, the following is what I claim as new therein and desire to secure by Letters Patent:

1. In an insect-exterminating machine, the combination of a suitable frame or base, front and rear cross-bars, vertically-adjustable standards, upper cross-bars supported by the standards, insect-receiving apparatus mounted horizontally adjustable on the lower cross-bars, insect-brushing apparatus mounted on the upper cross-bars, and suitable driving connections therefor, substantially as and for the purpose set forth.

2. In an insect-exterminating machine, the combination of a suitable frame or base, front and rear cross-bars, vertically-adjustable standards, upper cross-bars supported adjustably by the standards, insect-receiving apparatus mounted at its respective ends to be adjustable in and out on the lower cross-bars, insect-brushing apparatus mounted on the upper cross-bars, and suitable driving connections therefor, substantially as and for the purpose set forth.

3. In an insect-exterminating machine, the combination of a suitable frame or base, front and rear cross-bars, vertically-projecting screw-threaded standards, upper cross-bars supported adjustably by the standards, insect-receiving apparatus mounted on the lower cross-bars, insect-brushing apparatus mounted on the upper cross-bars, and suitable driving connections therefor, substantially as and for the purpose set forth.

4. In an agricultural implement, the combination of the longitudinal frame, the end standards secured to the sides of said frame and having upwardly and laterally projecting supporting parts, fan mechanism mounted on the upwardly-projecting supporting parts, and crushing or receiving mechanism mounted upon the laterally-extending supporting parts, substantially as and for the purpose set forth.

5. In an agricultural implement, the combination of the longitudinal frame, the standards 16 and 17 having slots 20 receiving the respective members of said frame and provided with upwardly-projecting threaded tubes 29 and the laterally-extending arms 26, the fanning mechanism mounted upon said threaded tubes and adjustable vertically thereon, the end plates 23 and 24 mounted upon said arms 26, and the crushing mechanism supported between said end plates, substantially as and for the purpose set forth.

6. In an agricultural implement, the combination of the longitudinal frame, the standards secured to said longitudinal frame and provided with sockets at their lower ends, and the longitudinal brace having its ends secured in said sockets, substantially as and for the purpose set forth.

7. In an agricultural implement, the combination of the vertical screws 29, cross-arms 73 and 74 mounted on said screws, brackets 80 mounted at the extremities of said cross-arms and providing angularly-arranged bearings, a transverse shaft 89 mounted in two of said bearings and receiving rotation from a moving part of the machine, longitudinal shafts 107 mounted in longitudinal bearings of said brackets and having their ends geared to the ends of the transverse shaft, and suitable plant-beating means carried by said shafts 107, substantially in the manner and for the purpose set forth.

8. In an agricultural implement, the combination of the upright parts 29, cross-arms 73 and 74 mounted on said uprights, brackets 80 secured to the said arms 73 and 74 and carrying bearings 85, 86, extending respectively longitudinally and transversely of the machine, a transverse shaft at one end of the machine mounted in the bearings 86, a clutch upon said shaft engaged with a moving part of the machine, a shifting rod 94 controlling said clutch, longitudinal shafts 107 mounted in the bearings 85 and geared so as to be turned by the end of the shaft 89, and beaters mounted upon said shafts 107, substantially as and for the purpose set forth.

9. In an agricultural implement, the combination of a suitable frame, arms extending laterally upon said frame, end plates 23 and 24, supported on said arms, and crushing-rollers mounted in said end plates and having suitable means for driving them, substantially as and for the purpose set forth.

10. In an agricultural implement, the combination of a suitable frame having lateral extensions, end plates 23 and 24, mounted on said extensions, rolls mounted in said end plates, scrapers 126 having their ends connected with said end plates, and means for adjusting the scrapers to the rolls, substantially as and for the purpose set forth.

11. In an agricultural implement, the combination of the main frame having lateral braces, end plates supported on said main frame, crushing-rolls mounted in said end plates, and scrapers having their ends secured to said end plates and also mounted on said braces of the main frame, substantially as set forth.

12. In an agricultural implement, the combination of a suitable frame, end plates 23 and 24 mounted on said frame, crushing-rollers mounted in said end plates, scrapers 126 adjacent to said rollers, and rods 130 threaded into said scrapers and adapted to adjust them relatively to the rollers, substantially as set forth.

13. In an agricultural implement, the combination of the main frame, the crushing-rollers suitably mounted on said implement, braces 39 for the frame of the implement, scrapers 126 adjacent to the rollers and having sockets 129 receiving the said braces, rods 130 for spacing the scrapers apart, and a bolt 132 passing through said rods and through the brace 39, substantially as and for the purpose set forth.

14. In an agricultural implement, the combination with a suitable frame or support; the end plates 23 and 24 mounted on said support, crushing-rollers mounted in said end plates, scrapers 126 having projecting ends 127 by which said scrapers are also secured in said end plates, and means for adjusting the scrapers, substantially as and for the purposes set forth.

15. In an agricultural implement, the combination of the crushing means, the fan for brushing insects into said crushing means, and the partitions on the sides of the crushing means opposite to the fans and each comprising sections 143 and 144 arranged at an angle; substantially as set forth.

16. In an agricultural implement, the combination of a suitable frame, an insect-receiver mounted on said frame, means for brushing insects from the vines into said receiver, and vine-guards 137 projecting forward from a point beneath the brushing means and having its upper side inclined upwardly from the front end to the level of the receiver, substantially as and for the purposes set forth.

17. In an agricultural implement, the combination of a suitable frame, uprights on said frame, insect-receptacles and vine-brushing means also mounted on said frame, and partitions secured at their upper edges to the uprights and at their lower edges to said insect-receptacles, substantially as and for the purpose set forth.

18. In an agricultural implement, the combination of the longitudinal frame, the rear supporting wheels or disks, and segmental frames in which said wheels or disks are mounted, pivoted to the longitudinal frame and having means for adjusting their angle and consequently the height of the machine at its rear end, substantially as explained.

19. In an agricultural implement, the combination of the longitudinal frame, the pivoted frames mounted in the rear end thereof and provided with racks, the wheels or disks mounted in said pivoted frames, and dogs engaging said racks for adjusting the angle of said pivoted frames, substantially as and for the purpose set forth.

20. In an agricultural implement, the combination of the longitudinal frame, the pivoted frames, supporting-disks thereon, racks formed on said pivoted frames, and a cross-rod having its ends bent and pivoted to the longitudinal frame and terminating in dogs which engage with the racks of the pivoted frames, substantially as and for the purpose set forth.

TOM HANSON.

Witnesses:
J. P. BUCKNER,
J. L. YOUNTLY.